United States Patent [19]

Wentworth, Jr.

[11] 4,183,541

[45] Jan. 15, 1980

[54] MECHANICAL SEAL ASSEMBLY

[75] Inventor: Robert S. Wentworth, Jr., Temecula, Calif.

[73] Assignee: Borg-Warner Corporation, Chicago, Ill.

[21] Appl. No.: 847,204

[22] Filed: Oct. 31, 1977

[51] Int. Cl.$^2$ .......................... F16J 15/30; F16J 15/54
[52] U.S. Cl. .......................................... 277/88; 277/87
[58] Field of Search ..................................... 277/88, 87

[56] References Cited

U.S. PATENT DOCUMENTS

| | | | |
|---|---|---|---|
| 2,222,654 | 11/1940 | Donaldson | 277/88 |
| 3,372,076 | 3/1968 | Wilkinson | 277/88 |
| 3,399,370 | 8/1968 | Mack | 277/88 |
| 3,515,394 | 6/1970 | Stevens | 277/88 |

Primary Examiner—Robert I. Smith
Attorney, Agent, or Firm—Aubrey L. Burgess

[57] ABSTRACT

A mechanical seal assembly especially constructed for use in low temperature environments in which an elastomer, i.e., an O-ring made of natural or synthetic rubber, is used as a substitute for the generally accepted and more expensive lapped or other types of joints.

1 Claim, 1 Drawing Figure

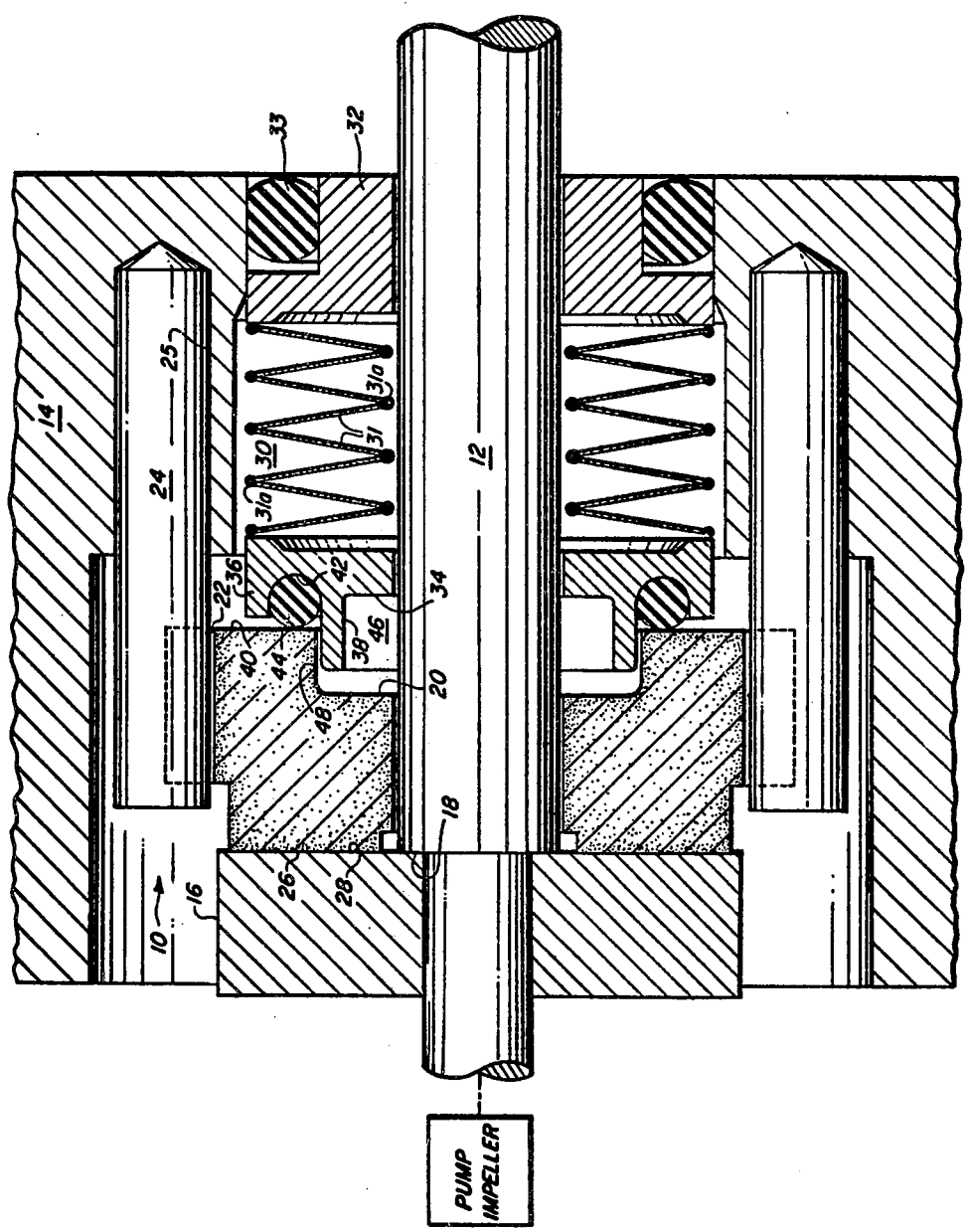

MECHANICAL SEAL ASSEMBLY

BACKGROUND OF THE INVENTION

Mechanical seal assemblies at cryogenic temperatures do not ordinarily include elastomers, such as natural or synthetic rubber, because such elastomers become hard and brittle at these temperatures. Conventional sealing between rotating and stationary members is usually accomplished by shrink fitting parts, the use of closely matched lapped surfaces, or by utilizing special "TEFLON"/metal sealing devices. While these conventional sealing systems are effective, the cost of the product is higher than one in which low cost elastomeric O-rings are used.

THE INVENTION

The mechanical seal of this invention comprises the customary seal rings and a bellows which functions to resiliently urge one of the seal rings toward the other. Most importantly, at least one O-ring of natural or synthetic rubber is substituted for the expensive lap joints and/or other sealing devices generally used in seals for use at cryogenic temperatures. In the operation of the present seal, the fact that the O-ring becomes hard and brittle under cryogenic conditions is unimportant. The carbon seal ring in the assembly which is associated with the bellows can contract under the effect of temperature and pressure independently of the metal parts of the bellows because of constructional features as will become apparent from the description to follow.

THE DRAWING

The single FIGURE of the drawing is a cross-section of a cryogenic mechanical seal constructed according to this invention.

DETAILED DESCRIPTION

The drawing illustrates, in section, a mechanical seal assembly 10 adapted to be associated with a rotatable shaft 12 and a relatively stationary housing 14. The seal assembly 10 comprises a rotatable seal ring 16, generally constructed of metal and fixed to the shaft 12 or to a sleeve (not shown) which is fixed to the shaft 12. The ring 16 is mounted in a reduced portion 18 of the shaft 12 (or on a sleeve fixed to the shaft).

The seal assembly 10 also comprises a stationary seal ring 20 fixed to the housing 14 by means of a plurality of pins 24 which are slidably seated in axial grooves 22 in the ring 20 and fixedly secured within openings 25 in the housing 14.

The seal ring 16 has a face 26 engaging the face 28 of the seal ring 20. The seal ring 20 is preferably constructed of carbon. A bellows 30, preferably constructed of a plurality of metal discs 31 welded together as indicated at 31a in the drawing, provides a resilient, axially directed force to urge the stationary seal ring 20 into contact with the rotatable seal ring 16. One end of the bellows 30 is welded to a bellows adapter ring 32 mounted in the housing 14 while the other end is welded to a bellows flange member 34. An O-ring 33 provides a fluid-tight seal between the ring 32 and the housing 14.

The bellows flange member 34, which has radial clearance from the shaft 12, is a generally annular member having axially extending portions 36 and 38 radially spaced from one another. The portions 36 and 38 define, with the rearward face or surface 40 of the seal ring 20, a cavity 42 to receive an elastomeric O-ring 44. The O-ring 44 may be constructed of natural or synthetic rubber and forms a seal between the bellows flange member 34 and the surface 40 of the ring 20. The portion 38 of the member 34 is longer in axial dimension than the portion 36 and is received in a cavity-like area 46 defined in part by an axially disposed rearward portion 48 of the seal ring 20. The construction and arrangement of the member 34 is such to substantially prevent it from cocking during use.

The seal 10 is effective to separate fluids in zones A and B, as is readily apparent from the drawing. In the event of contraction of the ring 20, the bellows, being under compression, will continue to urge it toward the ring 16 and also continue to urge the O-ring seal ring 44 into sealing engagement with the face 40. The latter continues even though the ring 44 becomes brittle and hard under cryogenic conditions.

I claim:

1. A mechanical seal assembly especially usuable in low temperature environments and adapted to be associated with a housing and a rotatable shaft, comprising:
   a rotatable seal ring adapted to be connected to said shaft;
   a stationary seal ring adapted to be connected to said housing;
   said seal rings having engaging said faces;
   said stationary seal ring having a rearwardly extending, radially outwardly disposed flange portion;
   a bellows resiliently urging said stationary seal ring toward said rotatable seal ring;
   a bellows adapter ring between said shaft and said housing;
   a bellows flange member radially spaced from said shaft;
   said bellows being connected at one end to said adapter ring and at the other end to said bellows flange member;
   said bellows flange member having two forwardly extending and radially spaced flange portions, one of which is of greater length than the other and which projects within said stationary seal ring flange portion;
   said bellows flange member portions defining a cavity with a rearward face of said stationary seal ring; and
   an elastomeric ring member in said cavity and being urged into engagement with said rearward face of said stationary seal ring by said bellows.

* * * * *

UNITED STATES PATENT OFFICE
CERTIFICATE OF CORRECTION

PATENT NO. : 4,183,541
DATED : January 15, 1980
INVENTOR(S) : ROBERT S. WENTWORTH It is certified that error appears in the above-identified patent and that said Letters Patent are hereby corrected as shown below:

Column 2, line 37, change "said faces" to -- seal faces --.

Signed and Sealed this

Eighth Day of April 1980

[SEAL]

Attest:

SIDNEY A. DIAMOND

Attesting Officer

Commissioner of Patents and Trademarks